(12) United States Patent
Bartimus

(10) Patent No.: US 6,622,393 B2
(45) Date of Patent: Sep. 23, 2003

(54) COMBINED STRING LINE ANCHOR AND PLUMB BOB

(76) Inventor: Christopher Shawn Bartimus, 1020 N. 2nd St., Payette, ID (US) 83661

( * ) Notice: Subject to any disclaimer, the term of this patent is extended or adjusted under 35 U.S.C. 154(b) by 0 days.

(21) Appl. No.: 09/847,614

(22) Filed: May 2, 2001

(65) Prior Publication Data

US 2002/0194743 A1 Dec. 26, 2002

(51) Int. Cl.$^7$ ............................. G01C 15/10; B43L 7/00
(52) U.S. Cl. ............................. 33/392; 33/413; 33/332
(58) Field of Search ........................... 33/413, 414, 392, 33/393, 394, 409, 332, 666, 353, 391, 1 G

(56) References Cited

U.S. PATENT DOCUMENTS

| | | | | | |
|---|---|---|---|---|---|
| 267,655 | A | * | 11/1882 | Vajen | 33/392 |
| 485,376 | A | * | 11/1892 | Fuller | 33/392 |
| 630,262 | A | * | 8/1899 | Nacke | 33/392 |
| 668,998 | A | * | 2/1901 | Napier | 33/392 |
| 909,846 | A | * | 1/1909 | Cavileer | 33/353 |
| 1,025,828 | A | * | 5/1912 | Paul | 33/392 |
| 1,098,033 | A | * | 5/1914 | Friendship | 33/413 |
| 1,596,882 | A | * | 8/1926 | Langsner | 33/392 |
| 1,949,652 | A | * | 3/1934 | McLaws | 33/392 |
| 2,446,253 | A | * | 8/1948 | Tresidder | 33/409 |
| 2,482,360 | A | * | 9/1949 | Moore | 33/666 |
| 2,594,823 | A | * | 4/1952 | Suverkrop | 33/392 |
| 3,016,616 | A | * | 1/1962 | Matson | 33/332 |
| 3,113,387 | A | * | 12/1963 | Bean, Jr. | 33/392 |
| 3,442,025 | A | * | 5/1969 | Mathiesen | 33/332 |
| 4,335,522 | A | * | 6/1982 | Canfield | 33/353 |
| 4,461,091 | A | * | 7/1984 | Gammon | 33/392 |
| 5,157,843 | A | * | 10/1992 | Barcewski | 33/392 |
| 5,720,113 | A | | 2/1998 | Bartimus | 33/314 |

FOREIGN PATENT DOCUMENTS

JP 57086012 A * 5/1982 ............... 33/392

OTHER PUBLICATIONS

Sketch of Asian tool believed by Applicant to have a long history of use in Asia, (no date).

* cited by examiner

Primary Examiner—Diego Gutierrez
Assistant Examiner—Mirellys Jagan
(74) Attorney, Agent, or Firm—Pedersen & Co., PLLC; Ken J. Pedersen; Barbara S. Pedersen

(57) ABSTRACT

This invention is a tool combining the function of a string line or chalk line anchor and a plumb bob. This combined tool is comprised of a dart-like body having a longitudinal axial bore. A sharpened spike is clamped within the longitudinal bore. The amount of the spike extending from the body may be adjusted to accommodate the variety of material hardnesses encountered at the work site. In addition this tool has the added functionally of being able to easily and quickly replace a damaged or broken spike.

5 Claims, 4 Drawing Sheets

COMBINED STRING LINE ANCHOR AND PLUMB BOB

BACKGROUND OF THE INVENTION

1. Field of the Invention

This invention relates generally to construction and carpentry equipment and tools, and more particularly to anchoring devices for string/chalk lines and plumb bobs.

2. Related Art

In building construction and carpentry projects, alignment strings and chalk lines are frequently used to confirm or establish straight lines. Such strings (or lines) have one portion that serves to store the unused portion of the string, e.g. a simple ball of string or, as is often the case, a reel of some sort is used to pay-out and pay-in the line. The other "free" end of the line is usually held by an assistant or anchored by a mechanical device. Such mechanical devices typically include a nail, an awl, a stickpin, and so forth. Frequently commercial chalk lines include an L-shaped hook with an eyelet tied to the line's free end. The hook is used to anchor the line over the edge of a workpiece. After the chalk line is properly positioned, the line is plucked near its center to cause a chalk mark to be left on the surface of the underlying material.

All of the above mentioned anchoring devices see considerable use at construction job sites. The stickpin is one of the more commonly used string line anchoring devices. These pins are about the size of an adult finger and have the general shape of the body of a dart (without feathers). The forward end of the stickpin, as in a dart, includes a highly sharpened, needle like point. In use, the string is tied around an annular groove in the stickpin, the pin is pressed by hand into the work surface and the line is then looped around the needle portion immediately adjacent to the surface. The other end of the line is then pulled to tighten the string against the stickpin. The needle portion of the stickpin is typically formed from a high strength steel so that it may be pushed by hand, without damaging the point, into a variety of non-metallic materials, such as wood, plywood, sheetrock, etc.

A significant disadvantage of known stickpins is that the length of the needle cannot be adjusted to allow the body of the stickpin to serve as a fixed stop for the insertion of the needle into materials of differing hardness. This capability is desirable so that the pin is not inserted further than is needed to satisfactorily anchor the string. If it is inserted too far it will leave an excessively large hole when it is removed. Also, the risk of breaking the needlepoint is also increased when it is inserted too far. Should the sharpened point be broken, in some cases it may be resharpened, if not, the tool must be discarded.

Plumb bobs are also frequently used by a carpenters and other construction industry professionals. As is well known, a plumb bob is used to determine the "plumbness" or verticality of a wall, stud column, etc. It also is used to vertically transfer a point at one elevation to another elevation.

In laying out construction projects, plumb bobs are frequently used in concert with string lines and chalk lines. The availability of a tool that integrates all the features of a string/chalk line stickpin anchoring device and a plumb bob would increase the efficiency of the carpenter and reduce overall expenses to the project. In addition, a tool that would allow replacement of a broken point in the stickpin would further increase the efficiency of the carpenter and decrease his/her equipment costs.

The prior art has been reviewed and only one relevant reference has been identified, U.S. Pat. No. 5,720,113, also by the current inventor. This earlier invention teaches an integrated string line anchoring device and plumb bob which is especially designed to accommodate the use of an L-shaped eyelet hook on the end of the string line. This prior tool has a dart-shaped body terminating in a sharpened point to serve as a stickpin anchor. The body has a recess for holding the L-shaped eyelet hook at the end of a string. The tool further incorporates a threaded cap that releasably retains the hook within the recess in the body. This tool is not configured for field replacement of the sharpened point. To serve as a plumb bob, the threaded cap is removed to reveal a groove in the body in which the string is placed to allow the tool to be suspended from it central axis, thus serving as a plumb bob. Alternatively, a slot may be provided in the cap to allow the string to be routed to the central axis suspension point. Although this tool is highly effective, it's utility is substantially expanded by the new invention and its novel features.

Thus it is object of the extant invention to provide an integrated string line anchoring device and plumb bob that provides a simple tool with a capability that significantly extends the utility and efficiency of the prior art. More specifically it is the primary object of this invention to provide an integrated string line anchor/plumb bob that eliminates the need for the aforementioned L-shaped eyelet hook at the end of the string line. It is a further object of this invention to provide for the replacement in the field of the sharpened point of the anchoring device. It is yet a further object of this invention to provide a tool in which the length of the exposed sharpened point of the tool may be varied to provide an adjustable penetration depth capability to the anchor. It is yet another object of this invention to provide a tool that is inexpensively manufactured and is formed from safe, durable and inexpensive materials that will stand up to the severe environment of the construction workplace.

SUMMARY OF THE INVENTION

This invention is a tool combining the function of a string line or chalk line anchor and a plumb bob. This combined tool is comprised of a dart-like body having a longitudinal axial bore. A sharpened spike is clamped within the longitudinal bore. The amount of the spike extending from the body may be adjusted to accommodate the variety of material hardnesses encountered at the work site. In addition this tool has the added functionally of being able to easily and quickly replace a damaged or broken spike. In use, a string or chalk line is tied to the combined tool around an annular groove provided in the tool. When the tool is used as a string line or chalk line, the attached line is led downwards through a channel that extends from the annular groove toward the spike and then wrapped around the spike adjacent to the work surface. When used as a plumb bob, the line is led from the spike around the outside the body and through a plumb bob string channel. This channel exits at the upper end of the tool at its axial centerline. The tool is then suspended from the line exiting at the axial centerline of the tool. A thumb pocket, which ergonomically fits the users thumb, is formed into the body to facilitate the use of the tool during manual insertion of the sharpened point, or spike, into a workpiece.

The body of the combined tool is preferably formed from a durable, high strength plastic material. The sharpened spike is preferably formed from high strength steel so that it resists breakage and may be sharpened.

These and many other features and attendant advantages of the invention will become apparent as the invention becomes better understood by reference to the following detailed descriptions and accompanying drawings.

DESCRIPTION OF THE PREFERRED EMBODIMENTS

Figure 1:
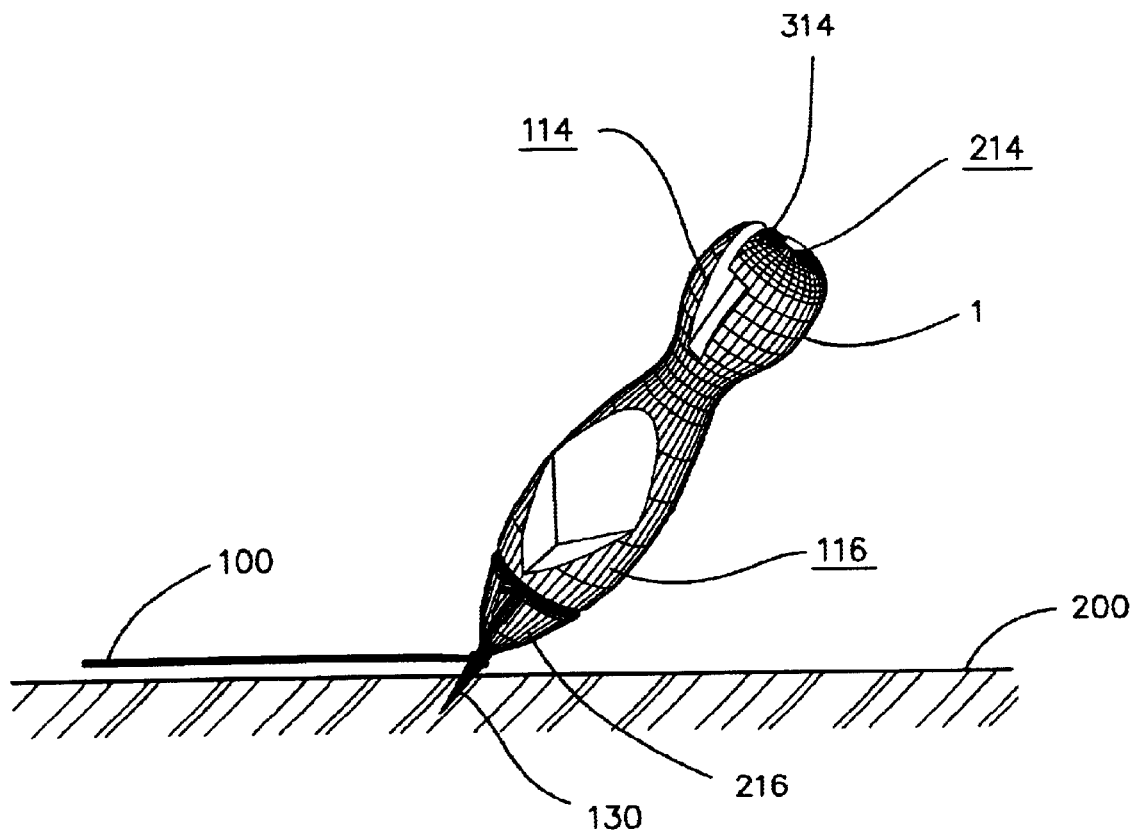
FIG. 1 shows the preferred embodiment of this invention in use as an anchor for a string or chalk line.
Figure 2:
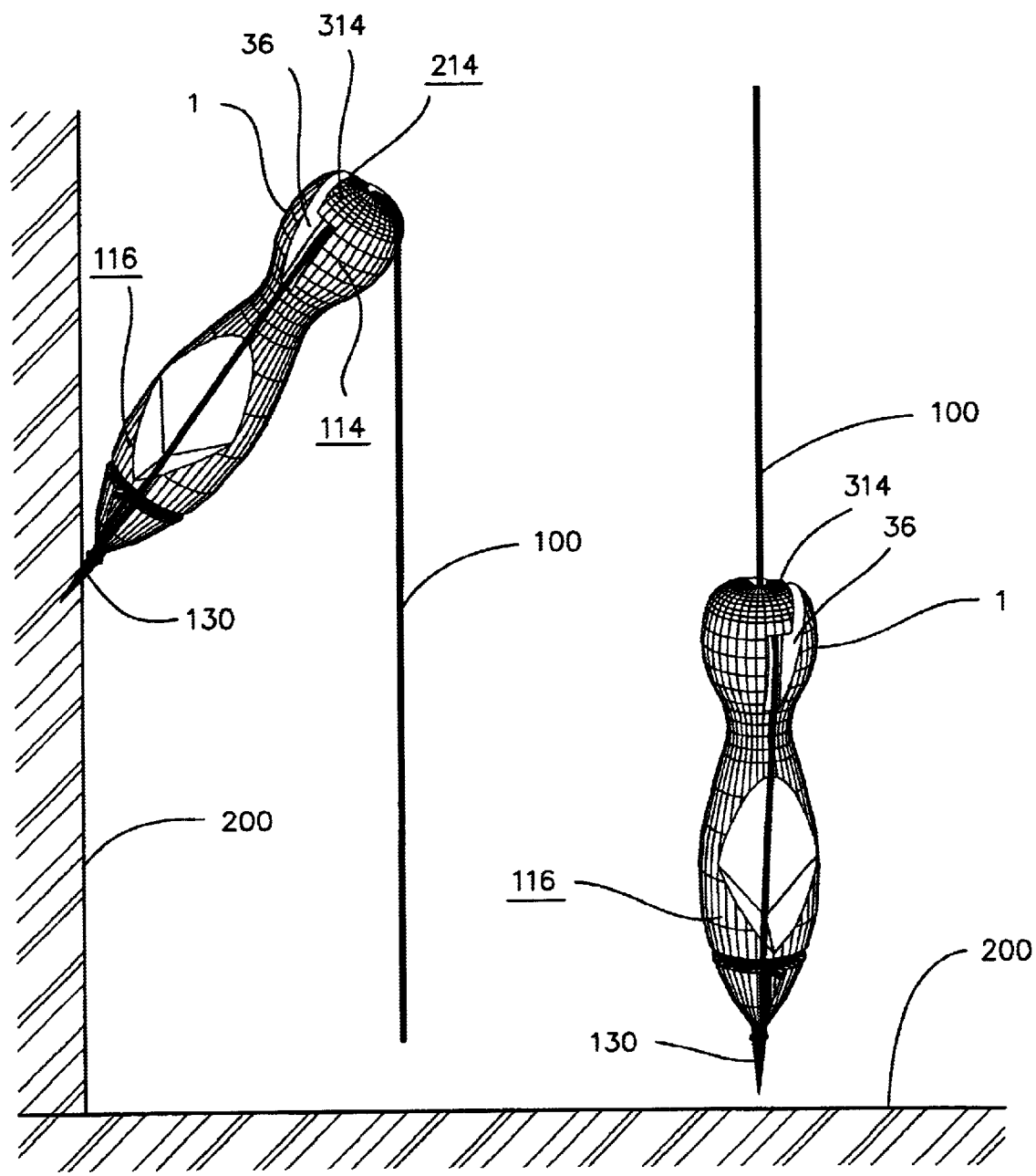
FIG. 2 shows two applications of this invention as a plumb bob.

FIG. 1 shows the preferred embodiment of this invention, a combined string line anchor and plumb bob 1, in use as a string or chalk line anchor. FIG. 2 shows two applications of this invention as a plumb bob. With reference to FIGS. 1 through 6, this invention comprises body 10 having a longitudinal axial bore 12, upper portion 14, lower portion 16, and neck portion 18 disposed between the upper and lower portions. Upper portion 14 has outer side surface 114 and upper end surface 214, and lower portion 16 has outer side surface 116 and lower end 216. This tool also has sharpened spike 30, with pointed end 130, adjustably and removably disposed within bore 12. Means for clamping 50 the spike to the body within its central bore is also provided.

Figure 3:
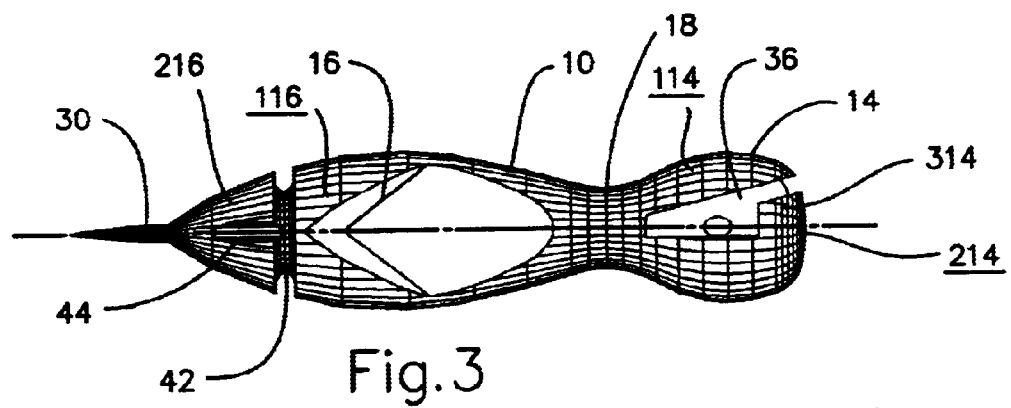
FIG. 3 is a plan view of this invention showing key features of its design.
Figure 4:
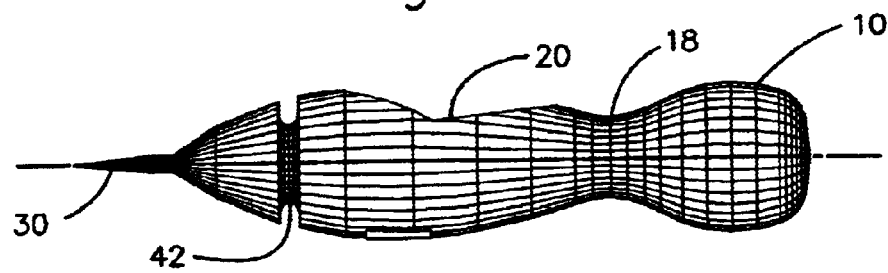
FIG. 4 is an elevation view of this invention showing also showing key design features.
Figure 5:
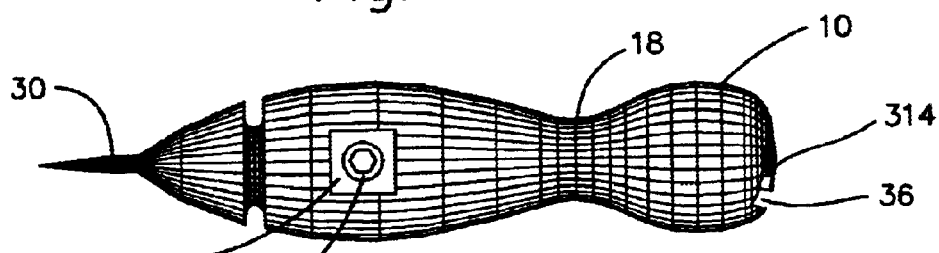
FIG. 5 is a bottom view of this invention showing the location of the means for clamping.
Figure 6:
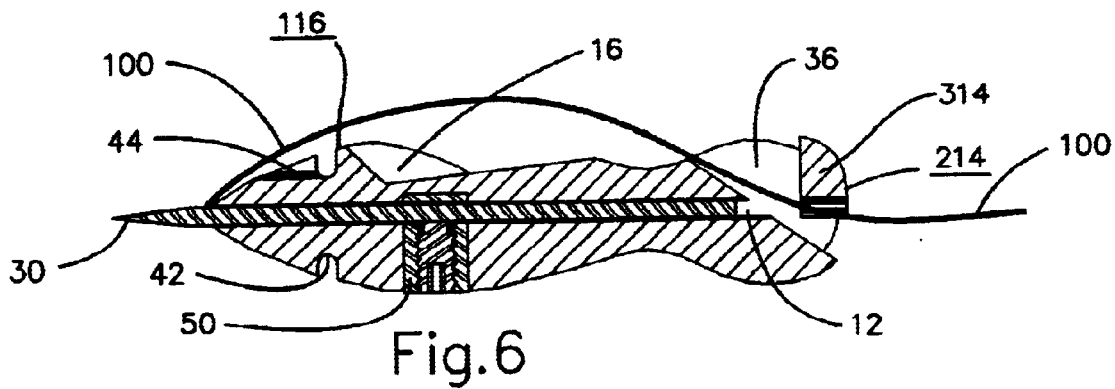
FIG. 6 is a full-length cutaway elevation view of this invention.

Body 10 is formed as a body of revolution having a dart-like shape having a circular cross-section along its axis. With specific reference to FIGS. 3 through 6, the circular cross-section of the body is a maximum within upper and lower portions 14, 16 and a minimum within neck portion 18. Best depicted in FIGS 3, 4 and 5, body 10 further includes annular line attachment groove 42. FIGS. 3 and 6 show anchor line channel 44. As shown in FIGS. 3, 4 and 5, thumb pocket 20 and means for clamping 50 are disposed between annular groove 42 and neck portion 18. FIG. 6 shows plumb bob string channel 36 which enables this invention to be used as a plumb bob. As illustrated in the Figures, the preferred string channel 36 is an open channel and a tab 314 of the upper portion extends circumferentially over a portion of the string channel 36.

Figure 7A:
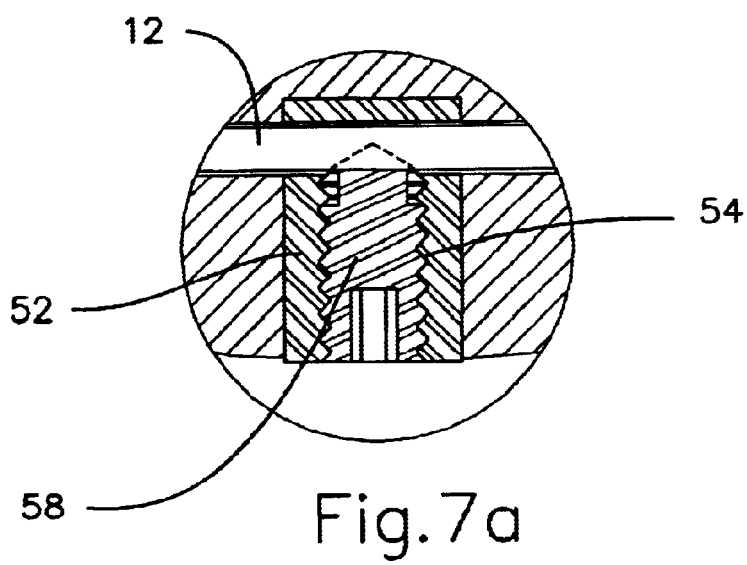
FIG. 7 includes isometric and section views of the means for clamping.
Figure 7B:
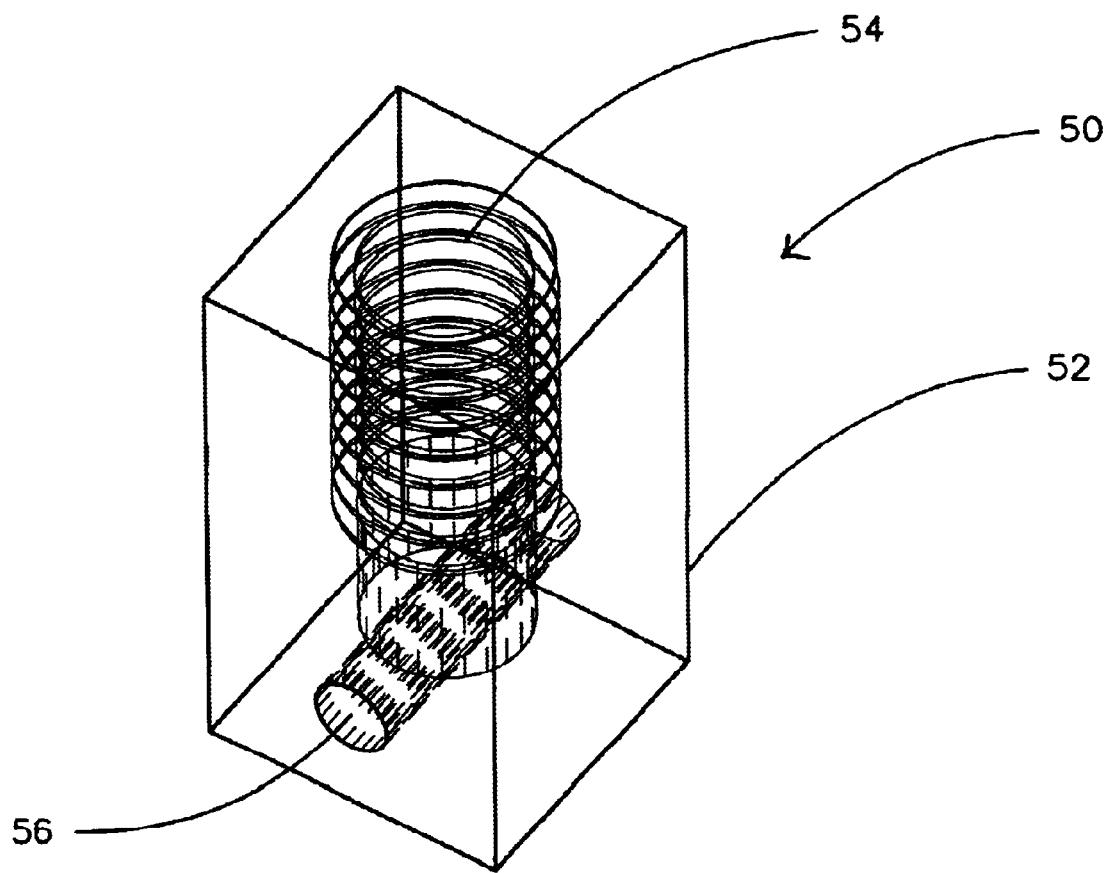

FIGS. 7a and 7b show the details of means for clamping 50 which includes clamping block 52 having internally threaded through-hole 54 and smooth bore through-hole 56. These through-holes intersect orthogonally. Internally threaded through-hole 54 cooperatively receives externally threaded setscrew 58 and smooth bore through-hole 56 cooperatively receives sharpened spike 30.

The sizes and materials of this invention are not critical. The sizes are important only insofar as the tool must be convenient to handle. The primary material consideration is that it must be durable and relatively inexpensive. In the preferred embodiment, body 10 is cast from a durable, high strength, synthetic plastic resin, like for example, Nylon™. Sharpened spike 30 is formed from hardened steel, as is clamping block 52 and setscrew 58.

The sizes of the preferred embodiment of the components of this invention are listed in the following table.

| Component | Figure Call Out | Length (in) | Width (in) | Diameter (in) | Depth (in) |
|---|---|---|---|---|---|
| Body | 10 | 2.5 | NA* | Variable | NA |
| Longitudinal Bore | 12 | 2.5 | NA | .06 | NA |
| Upper portion | 14 | NA | NA | .625 | NA |
| Lower portion | 16 | NA | NA | .625 | NA |
| Neck portion | 18 | NA | NA | .312 | NA |
| Thumb pocket | 20 | .94 | .5 | NA | .2 |
| Annular line attachment groove | 42 | NA | .15 | NA | .31 |
| Anchor line channel | 44 | NA | .15 | NA | .31 |
| Plumb bob string channel | 36 | NA | .15 | NA | .31 |
| Spike | 30 | 2.5 | NA | .057 | NA |
| Clamping Block | 52 | .04 | 025 | NA | .105 |
| Set screw | 58 | .28 | NA | .156 | NA |

*NA = Not Applicable

It is important that sharpened spike have a sliding fit, clearance of approximately 0.002 inches, within the longitudinal bore and within the clamping block. The clamping block is fixed within the body of the tool by securing set screw 58 against spike 30. The clamping block may be removed upon loosening the setscrew.

In use, this tool that integrates the functions of string and chalk line anchors with a plumb bob, is used the same as the conventional individual tools. With reference to FIGS. 1, 3 and 6, string 100 is tied to annular line attachment groove 42. When the tool is used to anchor string or chalk lines, the spike is first adjusted for its proper projection from the lower portion of the body. For softer materials it should project furthest, for harder materials, less. After adjusting the exposure of the spike, line 100 is led from the annular groove to the spike via anchor line channel 44 and wrapped around the spike close to working surface 200. The spike is pressed into working surface 200 to the desired depth and the line is then tensioned and used as any other string or chalk line. Referring now to FIGS. 2, 3 and 6, when the tool is to be used as a plumb bob, line 100 is led from spike 30, around body 10, to plumb bob string channel 36 which exits body 10 at its central axis. The tool is then suspended from line 100 to serve as a plumb bob.

Although this invention has been described above with reference to particular means, materials and embodiments, it is to be understood that the invention is not limited to these disclosed particulars, but extends instead to all equivalents within the scope of the following claims.

I claim:

1. A combined string line anchor and plumb bob device comprising:
   a body having a longitudinal axis, a longitudinal axial bore, an upper portion, a lower portion having a lower end and a lower portion side surface, and a sharpened spike with an exposed pointed end, the spike adjustably and removably disposed within the bore; and
   a string connected to said body at or near said spike;
   an adjustable-spike-exposure clamping system anchoring said sharpened spike in said body at various positions characterized by said pointed end extending various distances out from the body;

the upper portion consisting of:
an upper portion side surface having a circumference, an upper end surface, a string-receiving open channel extending from said upper portion side surface and said upper end surface to a location at or near the longitudinal axis, and a tab extending circumferentially over a portion of said open channel for retaining said string in said open channel;
wherein said string extends from the lower portion along said lower portion side surface, into said open channel, and out of said upper end surface.

2. A combined string line anchor and plumb bob device comprising:

a body having a longitudinal axis, a longitudinal axial bore, an upper portion having an outer side surface and an upper end surface with a center at or near the longitudinal axis, a lower portion having a lower end, and a neck portion disposed between the upper and lower portions;

a string-receiving passage in said upper portion adapted to receive a string so that the string extends out from said upper end surface; and a sharpened spike adjustably and removably disposed within the bore and extending out from said bore at said lower end; and a clamping system adapted to adjust the exposure of said sharpened spike out from bore, said clamping system being adapted to lock the sharpened spike in multiple positions with said spike extending out from said body, said multiple positions comprising a first position wherein said spike extends from the body a first distance for being inserted into a soft workpiece and a second position wherein said spike extends a second distance lesser than the first distance for being inserted into a harder workpiece;

wherein said upper portion outer side surface has a circumference, and said string-receiving passage is an open string channel extending from said upper portion outer side surface and said upper end surface into the upper portion to a location near the longitudinal axis, wherein said upper portion further has a tab that extends circumferentially over a portion of said open channel.

3. A combined string line anchor and plumb bob device comprising:

a body having a longitudinal axis, a longitudinal axial bore, an upper portion and an upper end surface, a lower portion having a lower end, and the body being adapted to receive a string so that the string extends out from the body;

a sharpened spike adjustably and removably disposed within the bore and extending out from said bore at said lower end; and a clamping system adapted to adjust the exposure of said sharpened spike out from bore, said clamping system being adapted to lock the sharpened spike in multiple positions with said spike extending out from said body;

wherein said clamping system is disposed within the lower portion and includes a clamping block having an internally threaded through-hole and smooth bore through-hole, said through-holes intersecting orthogonally, the threaded through-hole cooperatively receiving an externally threaded set-screw and the smooth bore through-hole cooperatively receiving said sharpened spike.

4. A combined string line anchor and plumb bob device comprising:

a body having a longitudinal axis, a longitudinal axial bore, an upper portion having an outer side surface and an upper end surface with a center at or near the longitudinal axis, a lower portion having a lower end, and a neck portion disposed between the upper and lower portions;

a string-receiving passage in said upper portion adapted to receive a string so that the string extends out from said upper end surface; and a sharpened spike adjustably and removably disposed within the bore and extending out from said bore at said lower end; and a clamping system adapted to adjust the exposure of said sharpened spike out from bore, said clamping system being adapted to lock the sharpened spike in multiple positions with said spike extending out from said body, said multiple positions comprising a first position wherein said spike extends from the body a first distance for being inserted into a soft workpiece and a second position wherein said spike extends a second distance lesser than the first distance for being inserted into a harder workpiece;

wherein the lower portion of said body includes an annular line attachment groove and an anchor line attachment channel.

5. A combined string line anchor and plumb device according to claim 4 wherein said body further includes a thumb pocket disposed between the annular line attachment groove and the neck portion.

\* \* \* \* \*